(12) United States Patent
Fischbach

(10) Patent No.: US 6,821,105 B1
(45) Date of Patent: Nov. 23, 2004

(54) INJECTION MOLDING MACHINE WITH A LINEAR MOTOR

(75) Inventor: Gunther Fischbach, Fürstenfeldbruck (DE)

(73) Assignee: Mannesmann Plastics Machinery GmbH, München (DE)

( * ) Notice: Subject to any disclaimer, the term of this patent is extended or adjusted under 35 U.S.C. 154(b) by 116 days.

(21) Appl. No.: 10/089,945

(22) PCT Filed: Aug. 28, 2000

(86) PCT No.: PCT/DE00/02990

§ 371 (c)(1),
(2), (4) Date: Apr. 5, 2002

(87) PCT Pub. No.: WO01/38069

PCT Pub. Date: May 31, 2001

(30) Foreign Application Priority Data

Nov. 23, 1999 (DE) .......................... 199 57 485

(51) Int. Cl.[7] ............................................. B29C 45/64
(52) U.S. Cl. ................... 425/214; 425/592; 425/593
(58) Field of Search ................. 425/214, 592, 425/593, 451.5, 451.6

(56) References Cited

U.S. PATENT DOCUMENTS 4,088,432 A  *  5/1978  Farrell ........................ 425/593

| 5,279,778 | A | * | 1/1994 | Taira et al. ................... 425/593 |
| 5,603,969 | A | * | 2/1997 | Guindani et al. ............ 425/593 |
| 6,124,648 | A | * | 9/2000 | Shibuya et al. ................. 425/3 |
| 6,419,861 | B1 | * | 7/2002 | Stirn et al. ................... 425/593 |

FOREIGN PATENT DOCUMENTS

| DE | 38 18 599 | * | 12/1988 |
| DE | 295 02 641 | | 3/1995 |
| DE | 190 44 468 | | 4/1998 |
| EP | 0 835 733 | | 4/1998 |
| JP | 61-154823 | * | 7/1986 |
| JP | 63-1516 | * | 1/1988 |

OTHER PUBLICATIONS

Patent Abstracts of Japan, vol. 010, No. 357, Dec. 1986.
Patent Abstracts of Japan, vol. 009, No. 279, Nov. 1985.
Patent Abstracts of Japan, vol. 012, No. 195, Jun. 1988.
Zusammenfassung. JP 63001516. Derwent Publication Ltd., Jan. 1988.

* cited by examiner

Primary Examiner—James P. Mackey
(74) Attorney, Agent, or Firm—Cohen, Pontani, Lieberman & Pavane

(57) ABSTRACT

The invention pertains to a closing device in the form of an injection-molding machine for plastics with a stationary mold clamping plate and a movable mold clamping plate, which can be operated by a linear motor. At least one linear motor (41, 42) is connected to a force transmission element (21, 22) which is connected to a lever mechanism (31–33).

20 Claims, 5 Drawing Sheets

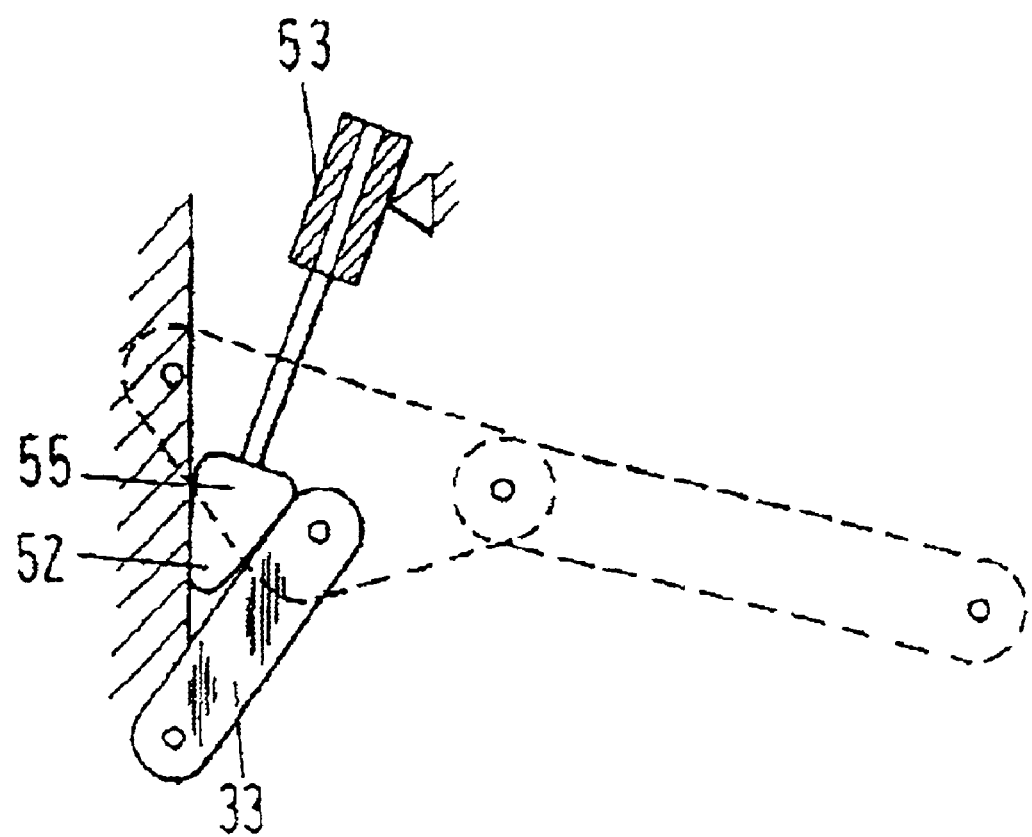

INJECTION MOLDING MACHINE WITH A LINEAR MOTOR

PRIORITY CLAIM

This is a U.S. national stage of application No. PCT/DE00/02990, filed 28 Aug. 2000. Priority under 35 U.S.C. §119(a) and 35 U.S.C. §365(b) is claimed from German Application No. 199 57 485.5, filed 23 Nov. 1999.

BACKGROUND OF THE INVENTION

1. Field of the Invention

The invention pertains to a closing device in the form of an injection molding machine for plastics with a stationary mold clamping plate and with a movable mold clamping plate, which can be operated by a linear motor.

2. Description of the Related Art

A closing unit in which the end plate cooperates with the plunger to form a linear motor is known from DE 37 15 161 A1. The 3-phase windings are provided in the end plate and the plunger is designed as a "rotor" rail.

The disadvantage of this design is the relatively weak closing force which can be exerted by the linear motor. In another embodiment, therefore, an electromagnet is provided to produce the required closing pressure; when current is flowing through this electromagnet, it induces a force on the plunger directed toward the mold.

The efficiency of linear motors is especially poor at low speeds and when no motion at all is occurring. In the design described in the previously cited document, however, the maximum demand for force occurs as the closing force is being built up. The only movement which occurs in this phase is that which results from the expansion of the tie bars. This leads to an uneconomically large installation cost for the linear motor and for the converter required to operate the drive.

It must also be expected that the amount of energy consumed will be uneconomical in comparison with rotating motors. This disadvantage cannot be avoided by the use of a divided end plate provided with electromagnets to build up the closing force. The expansion of the tie bars leads in this solution to a considerable widening of the air gap and thus to a drastic drop in the amount of force which can be transmitted. The only way to compensate for this is to increase the size of the magnets of the tie bar to an uneconomical extent.

In the proposed solution, furthermore, the closing force must continue to be actively applied during the injection, holding pressure, and cooling phases, which means that large amounts of energy must be consumed continuously.

An injection-molding machine is known from EP 0 280 743 B1, to which U.S. Pat. No. 4,895,505 corresponds, in which a linear motion element, here a metering/injection screw, is designed as a linear motor. The linear motor has a cylindrical form, which corresponds to a movable element with a circular cross section.

This design is called a solenoid motor and is used for applications with low force requirements. Solenoid motors achieve only a fraction of the force which can be generated by linear motors of the single-comb or multi-comb type.

The forces required to move the screw of an injection molding machine in a linear manner cannot be compared with the closing forces required to close the mold of an injection-molding machine; that is, they are typically are 5–10 times smaller. Because no additional rotational movements of the axle, which is moved in a linear fashion, are required to close the mold, a solenoid motor offers only disadvantages for this application.

A plastic injection-molding machine is known from DE 38 18 599 A1, in which at least some of the working elements are driven by arrangements of electrically superconducting magnets, the conductors of which are cooled by a coolant to a temperature below the transition point. One of these working elements is a toggle lever for closing the mold, for which electrically superconducting linear electromotors are provided for the linear motion.

This device suffers from the disadvantage that, to achieve the transition temperature required for the superconducting state, a conductor winding is required which consists of a special alloy, which must also be cooled. An alloy of this type consists in particular of the expensive metal lanthanum or yttrium, plus barium, copper, and oxygen. The transition temperature is reached in particular by the use of liquid nitrogen and is thus associated with significant technical effort.

SUMMARY OF THE INVENTION

The invention has the goal of creating a closing device of the general type in question which makes it possible by means of a simple design to move the movable mold clamping plate and to hold it in position at low expenditure of energy and without contamination.

According to the invention, at least one linear motor is connected to a force transmission element, which is connected in turn to a lever mechanism. This force transmission element can be designed as a crosshead or as an actuating frame.

Double-toggle levers are used here, where four-point and five-point toggle levers are preferred.

The geometry of the individual levers and the control program are selected so that, in the closed position of the movable mold clamping plate, the plate is held without any consumption of energy during the closed phase.

To achieve an especially short design, the linear motors are installed between the force transmission element and either the end plate or the movable mold clamping plate. In an especially advantageous design, the stationary part is attached to the end plate, and the mobile part is attached to the force transmission element. As a result, there is no need for a drag line.

In another advantageous design, a tie bar of the closing unit is used as the reaction rail of the linear motor.

During the closed phase of the movable mold clamping plate, the linear motors are turned off. As a result of this measure, the noise level is reduced and energy is also saved. This is achieved by the use of toggle levers, which have such dimensions and are actuated in such a way via a control program that the dead center point is passed.

In another design, an arresting element is provided, which, during the closed phase, holds or grips at least one lever in a form-locking or friction-locking manner. The arresting elements are designed so that drive energy is required only for the locking and unlocking processes.

According to the invention, linear motors are used in a pairwise arrangement. As a result of this design, the gap forces are essentially compensated.

An essential advantage of the invention is that the linear motion is produced directly, without the need to convert a rotation into a translation by the use in particular of a gear transmission. The elimination of a transmission minimizes the maintenance work required and increases the reliability of the machine. Without a transmission, the drive operates without any hysteresis or clearance at all, which increases the precision and the controllability of the motion.

The principle of the linear drive imposes no limit of any kind on the speed or on the force of the motion, as is associated with a solution in the form of a transmission or a worm.

BRIEF DESCRIPTION OF THE DRAWINGS

FIG. 4 shows an arresting device designed as a stop block; and

DETAILED DESCRIPTION OF THE PRESENTLY PREFERRED EMBODIMENTS

Figure 1:
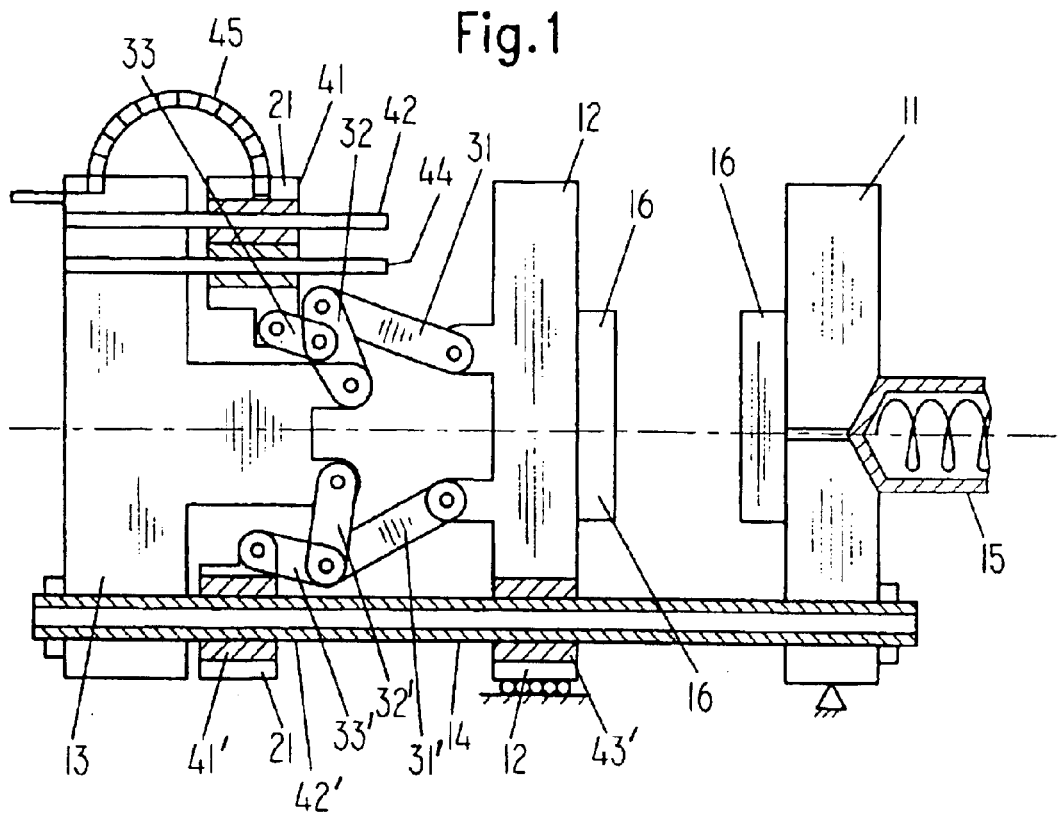
FIG. 1 shows a closing device with an actuating frame for a mold in the open position.
Figure 2:
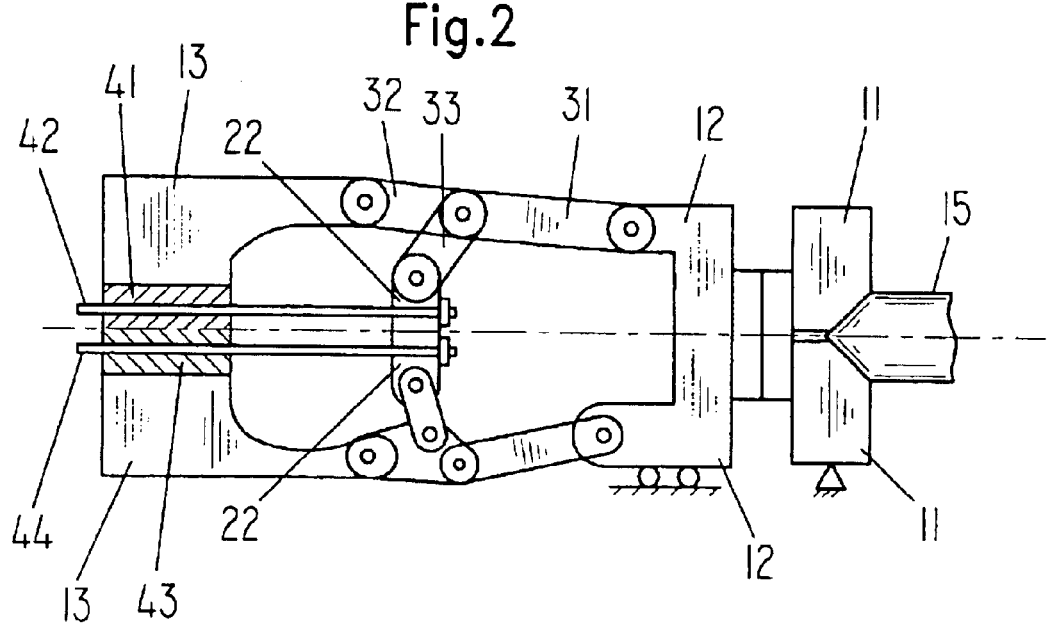
FIG. 2 shows a closing device with a crosshead for a mold in the open position.

FIGS. 1 and 2 show an injection molding machine with a stationary mold clamping plate 11, a movable mold clamping plate 12, and an end plate 13. An injection cylinder 15 is mounted on the stationary mold clamping plate. The mold 16 is attached to the mold clamping plates 11, 12.

FIG. 1 shows an injection-molding machine with a force transmission element, which is designed as an actuating frame 21.

The movable mold plate 12 can be seen in the open position in FIG. 1. Between the movable mold clamping plate 12 and the actuating frame 21, in the upper part of the figure is a five-point toggle lever 31–33.

The inductor combs 41, 43 of a first double comb linear motor are arranged in a pairwise manner in the actuating frame. The reaction rails 42, 44 are connected to the end plate 13.

To supply energy and cooling water, the actuating frame 21 is connected by way of a drag line 45 to the end plate.

Figure 1A:
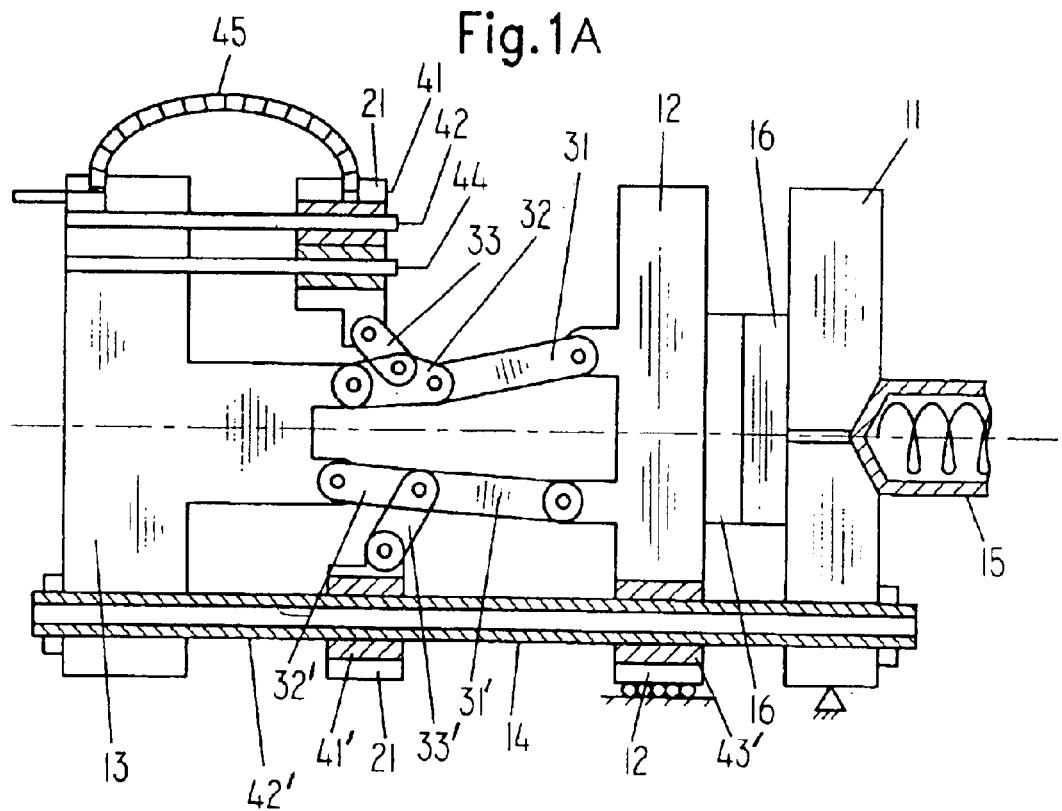
FIG. 1A shows the closing device of FIG. 1 for a mold in the closed position.

The movable mold clamping plate can be seen in the closed position in FIG. 1A. Between the mold clamping plate 12 and the end plate 13, in the lower part of the Figure, there is a four-point toggle lever 33'—33'.

An inductor comb 41' is provided in the actuating frame 21. This comb surrounds a tie bar 14, designed as a reaction rail 42' having a hollow rectangular cross section.

Also in FIG. 1A, we see that the tie bar 14 guides a second inductor comb 43', which is mounted in the movable mold clamping plate 12. The combs 41', 43' and the reaction rail 42' form a second double comb linear motor.

In FIG. 2, the force transmission element is designed as a crosshead 22.

In the upper part of the figure, the movable mold clamping plate 12 is in the closed position. Under the end plate 13 is a four-point toggle lever 31–33. The levers 31 and 32 have passed the dead center point and can be kept in the closed position without the consumption of energy. The toggle levers 31, 32 are connected to the crosshead by the lever 33. A reaction rail 42 is attached to the crosshead; this rail is in working connection with an inductor comb 41. The inductor comb 41 is arranged parallel to another inductor comb 43, which is connected via a reaction rail 44 to the crosshead 22.

Figure 2A:
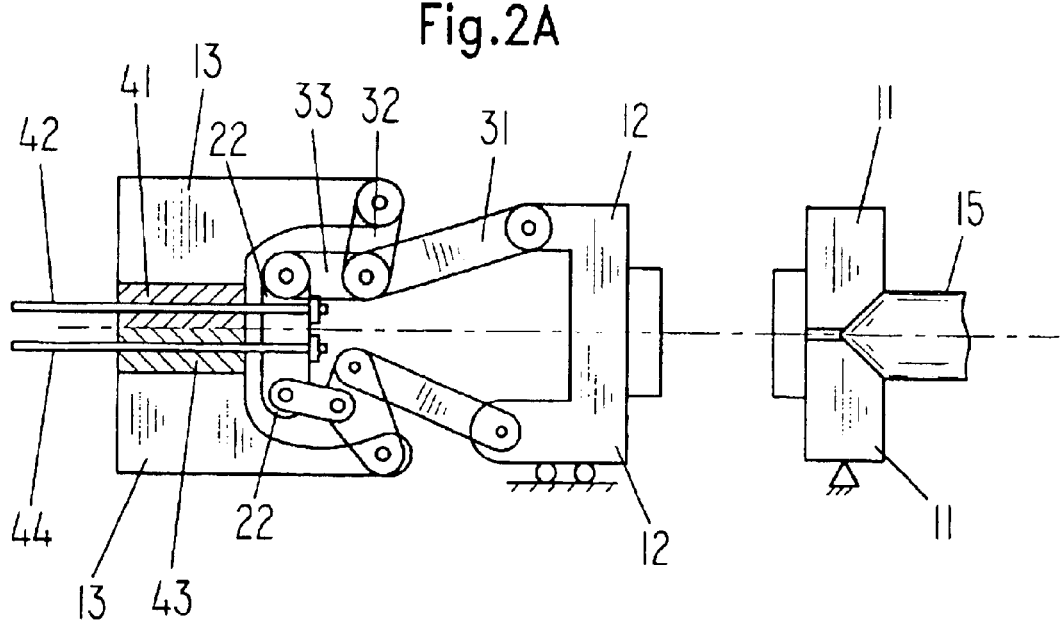
FIG. 2A shows the closing device of FIG. 2 for a mold in the closed position.

In the lower part of FIG. 2A the movable mold clamping plate 12, which is in the open position, is connected to the crosshead 22 with a five point toggle lever.

Figure 3:
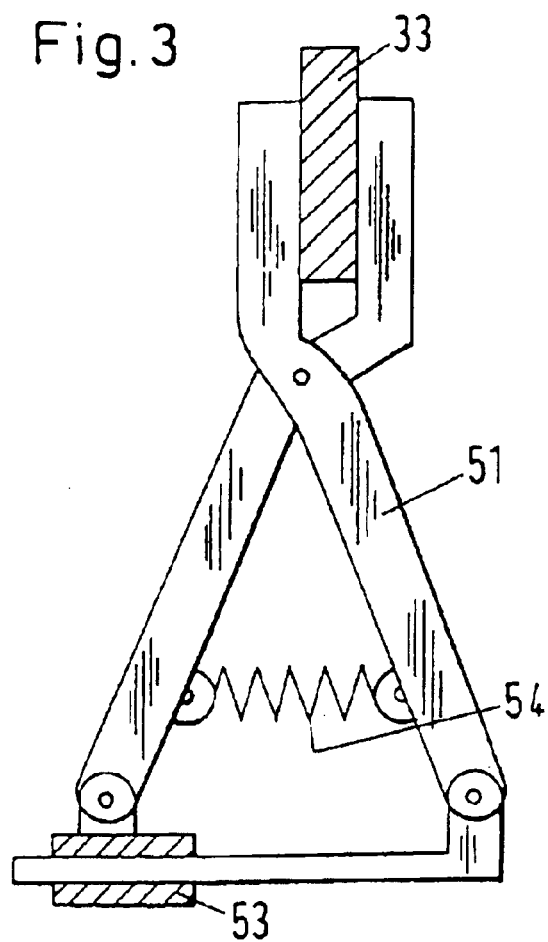
FIG. 3 shows an arresting device designed as a pair of pliers.

FIG. 3 is a sectional view of a lever 33, which can be held by a friction-locking component 51. In the upper part of FIG. 3, the component 51 is designed as a pair of pliers, which can be held in the closed position by a spring 54. To open the pliers, a linear motor 53 is provided on the end of the handle opposite the lever 33.

Figure 3A:
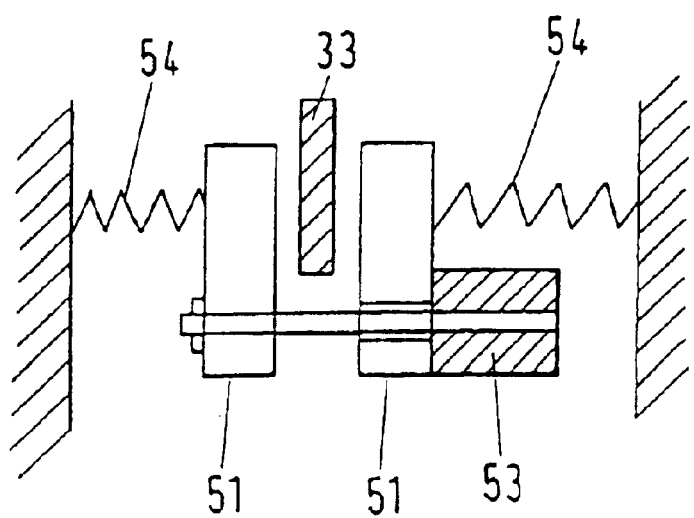
FIG. 3A shows an arresting device designed as a disk brake caliper.

FIG. 3A, the friction-locking component is designed as a disk brake caliper 52, which holds the lever 33 via compression springs 54 and which can be opened by a linear drive 53.

FIG. 4 shows a form, locking component, here in the form of a wedge 55, which can be moved against the lever 33 by a linear motor 53.

Figure 5:
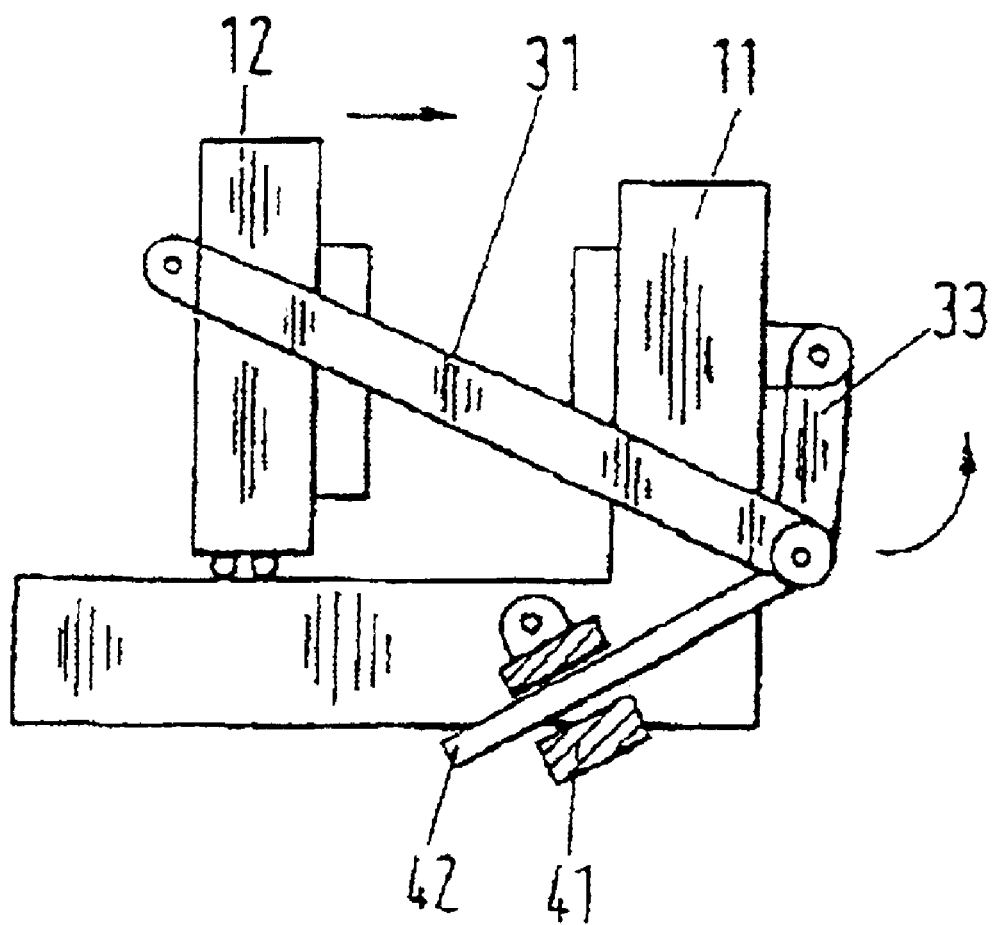
FIG. 5 shows a free-space machine.

FIG. 5 shows a free-space machine with the stationary mold clamping plate 11, which is connected via lever 33 and lever 31, connected in articulated fashion to each other, to the movable mold clamping plate 12. The toggle lever, consisting of the levers 31 and 33, is connected to a linear motor 53 consisting of the reaction rail 42 and the inductor comb 41.

What is claimed is:

1. A closing device for a plastics injection molding machine of the type having a stationary mold clamping plate and a movable mold clamping plate, said closing device comprising
   a lever mechanism for moving the movable mold clamping plate,
   a force transmission element attached to the lever mechanism, and
   at least one double comb linear motor which can drive said force transmission element in order to pivot said lever mechanism in order to move said movable mold clamping plate relative to said stationary mold clamping plate.

2. A closing device as in claim 1 comprising two said double comb linear motors.

3. A closing device as in claim 1 wherein said force transmission element is an actuating frame, said lever mechanism comprising an outward acting toggle lever mechanism connected to said actuating frame.

4. A closing device as in claim 1 wherein said force transmission element is a crosshead, said lever mechanism comprising an inward acting toggle lever mechanism connected to said crosshead.

5. A closing device as in claim 1 wherein said lever mechanism is a toggle lever mechanism comprising a double toggle lever.

6. A closing device as in claim 5 wherein said toggle lever mechanism is a five point toggle lever mechanism further comprising a connecting lever connecting said force transmission element to one of said toggle levers.

7. A closing device as in claim 1 further comprising a stationary end plate, each said double comb linear motor comprising a pair of reaction rails and a pair of inductor combs, said reaction rails being fixed in said force transmission element, said combs being fixed in said end plate.

8. A closing device as in claim 1 further comprising a stationary end plate, each said double comb linear motor comprising at least one reaction rail and a pair of inductor combs, said reaction rail being fixed to said stationary end plate, said inductor combs being fixed in at least one of said force transmission element and said movable mold clamping plate.

9. A closing device as in claim 8 further comprising a drag line for supplying energy and coolant to said combs.

10. A closing device as in claim 1 wherein said lever mechanism is a toggle lever mechanism which can lock the movable mold clamping plate in a closed position without being driven in the closed position.

11. A closing device as in claim 1 further comprising an arresting device which prevents the movable mold plate from opening without being driven when said movable mold plate is in a closed position, said lever mechanism comprising at least one lever which is acted on by said arresting device.

12. A closing device as in claim 11 wherein said arresting device is in spring loaded frictional engagement with said lever when said arresting device is not driven.

13. A closing device as in claim 11 wherein said arresting device comprises a wedge-shaped stop block which acts on said lever in a form-locking manner when said movable mold plate is in said closed position.

14. A closing device as in claim 11 wherein said arresting device comprises a linear motor which drives said arresting device.

15. A closing device as in claim 8 wherein at least one of said reaction rails is a tie bar fixed to said stationary end plate and to said stationary mold clamping plate, said tie bar having a hollow rectangular cross section.

16. A closing device as in claim 3 wherein one said double comb linear motor comprises a pair of inductor combs on said actuating frame.

17. A closing device as in claim 3 wherein said lever mechanism comprises a pair of outward acting toggle lever mechanisms connected to said actuating frame.

18. A closing device as in claim 4 wherein one said double comb linear motor comprises a pair of inductor combs fixed in a stationary end plate and a pair of reactor rails fixed to said crosshead.

19. A closing device as in claim 4 wherein said lever mechanism comprises a pair of inward acting toggle lever mechanisms connected to said crosshead.

20. A closing device as in claim 8 wherein one said double comb linear motor comprises an inductor comb fixed in said force transmission element and inductor comb fixed in said movable mold clamping plate.

* * * * *